United States Patent [19]
Yoshida et al.

[11] Patent Number: 5,409,608
[45] Date of Patent: Apr. 25, 1995

[54] FILTER FOR IN-TANK PUMP OF AUTOMOBILE FUEL TANK

[75] Inventors: Shigeru Yoshida, Toyota; Shinichi Fujii, Anjo; Hideya Miura, Toyoake, all of Japan

[73] Assignees: Aisan Industry Co., Ltd., Ohbu; Nifco Inc., Yokohama, both of Japan

[21] Appl. No.: 995,984

[22] Filed: Dec. 23, 1992

[30] Foreign Application Priority Data

Dec. 27, 1991 [JP] Japan ............................ 3-112807 U

[51] Int. Cl.⁶ .......................................... B01D 35/027
[52] U.S. Cl. ..................... 210/315; 210/316; 210/342; 210/461; 210/462; 210/485; 210/486; 210/489; 210/497.01; 210/499
[58] Field of Search ...................... 210/172, 416.4, 461, 210/485, 486, 499, 462, 484, 487, 489, 497.01, 323.2, 342, 315, 316

[56] References Cited

U.S. PATENT DOCUMENTS

| | | | |
|---|---|---|---|
| 4,617,121 | 10/1986 | Yokoyama | 210/416.4 |
| 5,055,187 | 10/1991 | Ito et al. | 210/172 |
| 5,084,166 | 1/1992 | Shiraga et al. | 210/172 |

FOREIGN PATENT DOCUMENTS 61-51471 4/1986 Japan .

*Primary Examiner*—Matthew O. Savage
*Attorney, Agent, or Firm*—Oblon, Spivak, McClelland, Maier & Neustadt

[57] ABSTRACT

A filter for an in-tank pump of an automobile fuel tank includes a flat bag-shaped filter body, a connector body and a suction nozzle. The filter body has a closed front end and a rear end wall and includes a mesh member and a filter frame having a plurality of longitudinal and lateral ribs formed on the upper and lower portions thereof. The connector body includes a cylindrical attachment for attaching the filter body to a suction port of an in-tank pump and an end plate joined to an outer surface of the rear end wall of the filter body. The suction nozzle is attached to the end plate of the connector body so that it communicates with the cylindrical attachment and thrusts into the filter body. The suction nozzle is made of a deformable material and formed into a mesh cylinder having a closed forward end disposed within the filter body at a position of the closed front end of the filter body.

6 Claims, 2 Drawing Sheets

FILTER FOR IN-TANK PUMP OF AUTOMOBILE FUEL TANK

BACKGROUND OF THE INVENTION

1. Field of the Invention

The present invention relates to a filter attached to a downwardly directed suction port of an in-tank pump of an automobile fuel tank for filtering gasoline pumped up from the the fuel tank and supplied into the internal combustion chamber.

2. Description of the Prior Art

Various filters for the in-tank pump of an automobile fuel tank have heretofore been proposed. For example, Japanese Utility Model Public Disclosure No. 61-51471 discloses such a filter. As shown in FIG. 5, the prior art filter comprises a flat bag-shaped filter body 10 including a mesh member and a filter frame having a plurality of longitudinal and lateral ribs, a connector body including a cylindrical attachment for attaching the filter body 10 to the suction port of a fuel tank T and an end plate joined to the outer surface of the end wall of the filter body 10, and a suction nozzle 30 attached to the end plate of the connector body so that it communicates with the cylindrical attachment and thrusts into the filter body 10.

When the prior art filter is attached to the in-tank pump P, the lower surface of the filter body 10 comes into contact with the bottom of the fuel tank T in order to enable gasoline near the fuel tank bottom to be pumped up. The front end 19 of the filter body 10 is closed like a closed bag by fusing the front end of the mesh member. The rear end portion of the filter body 10 is attached to the end plate of the connector body. The suction nozzle 30 extending forward within the filter body 10 is a pipe made of a hard plastic material and having a prescribed diameter. For this reason, the leading end of the pipe-like suction nozzle 30 cannot be displaced at a forward inside portion of the filter body 10 having a distance between the upper and lower thin surfaces thereof smaller than the diameter of the suction nozzle 30 because the leading end of the suction nozzle otherwise damages the filter body 10. Therefore, the leading end of the suction nozzle 30 has to be positioned substantially at the center portion within the filter body 10.

With the construction of the prior art filter, if the liquid level of gasoline is inclined as shown by A in FIG. 5 due to rapid turning of an automobile, the suction nozzle can still pump up the gasoline. However, when the gasoline decreases in volume and is inclined to assume its level as shown by B in FIG. 5, the gasoline can no longer be pumped up. As a result, the knocking phenomenon will arise.

The present invention has been accomplished in view of the drawbacks encountered by the prior art filter.

The main object of the present invention is to provide a filter having flexibility and enabling gasoline near the fuel tank bottom to be pumped up.

SUMMARY OF THE INVENTION

To attain the object described above, according to the present invention there is provided a filter for an in-tank pump of an automobile fuel tank, comprising a flat bag-shaped filter body having a closed front end and a rear end wall and including a mesh member and a filter frame having a plurality of longitudinal and lateral ribs formed on upper and lower portions thereof, a connector body including a cylindrical attachment for attaching the filter body to a suction port of an in-tank pump and an end plate joined to an outer surface of the rear end wall of the filter body, and a suction nozzle attached to the end plate of the connector body so that it communicates with the cylindrical attachment and thrusts into the filter body, the suction nozzle being made of a deformable material and formed into a mesh cylinder having a closed forward end disposed within the filter body at a position of the closed front end of the filter body.

The above and other objects, characteristic features and advantages of the present invention will become more apparent to those skilled in the art from the disclosure of the present invention made hereinbelow with reference to the accompanying drawings.

DETAILED DESCRIPTION OF THE PREFERRED EMBODIMENT

Figure 1:
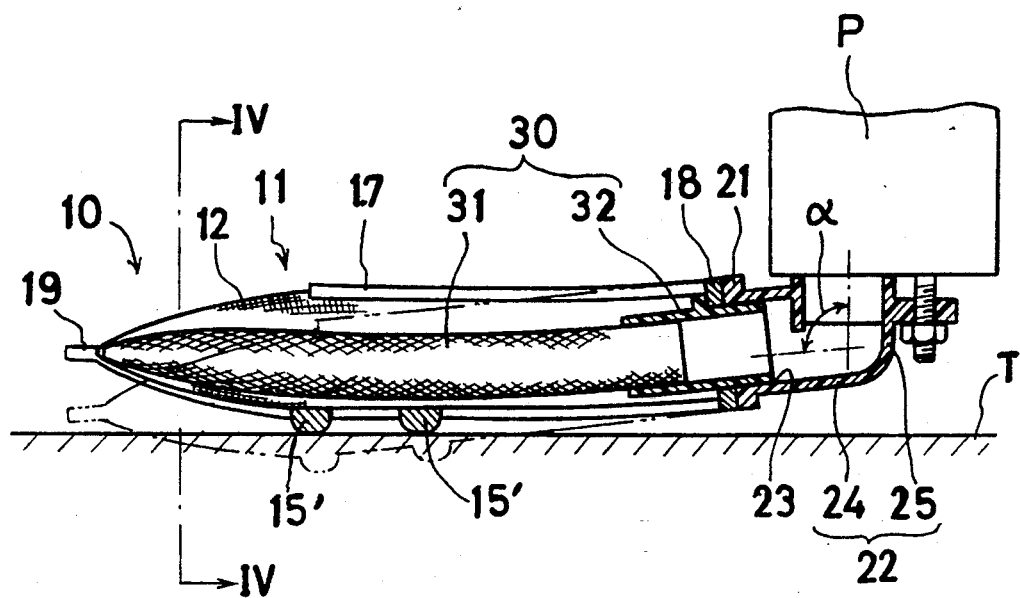
FIG. 1 is a longitudinally sectioned side view illustrating one embodiment of the filter according to the present invention.
Figure 2:
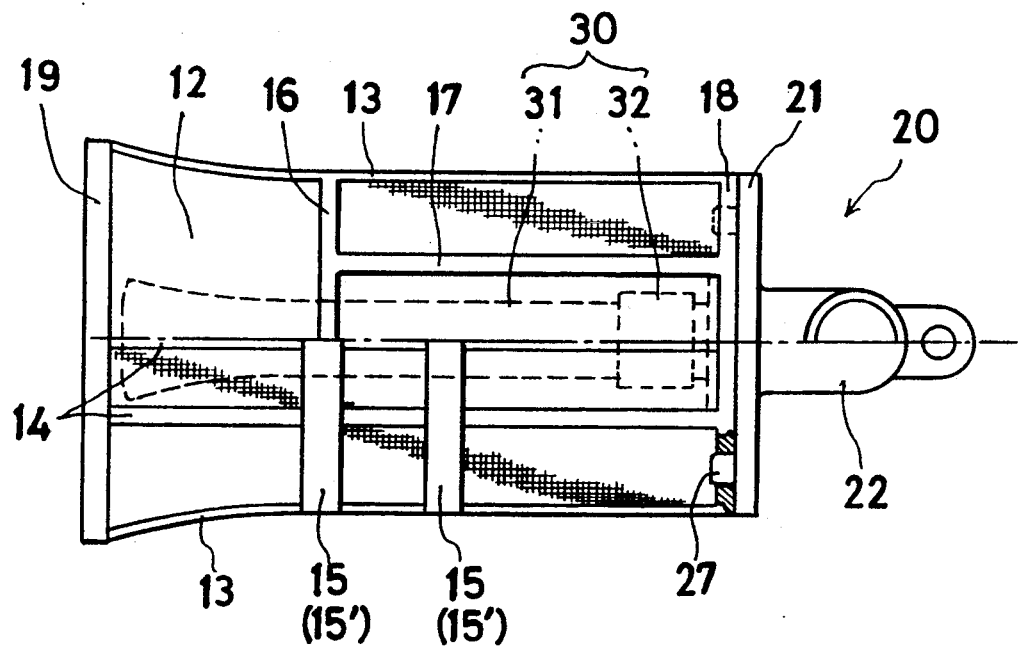
FIG. 2 is a plan view of the filter, with the upper half seen from above and the lower half from below.

The present invention will now be described in detail with reference to the illustrated embodiment, in which the filter comprises a flat filter body 10, a connector body 20 and a suction nozzle 30.

The filter body 10 includes a filter frame 11 having a plurality of longitudinal and lateral ribs and a mesh member 12 extending between adjacent ribs. The filter frame 11 is made of an elastic material such as soft nylon 6 or elastomer and has a pair of longitudinal ribs 13 formed on the opposite sides thereof so as to extend over the entire length thereof, a plurality of longitudinal ribs 14 formed on the lower portion thereof so as to be spaced apart at substantially regular intervals in the width direction and extend over the entire length thereof, a plurality of front and rear lateral ribs 15 formed on the lower portion thereof so as to bridge the pair of opposed longitudinal ribs 13, a lateral rib 16 formed on the upper portion thereof so as to bridge the pair of opposed longitudinal ribs 13, a plurality of longitudinal ribs 17 connected at their respective front ends to the lateral rib 16 and extending backward, and an elliptical rear end wall 18 having an outer periphery to which the rear ends of the longitudinal ribs 13, 14 and 17 are connected. Each of the front and rear lateral ribs 15 has a lower bulged portion 15' which comes into resilient contact with the bottom of a fuel tank T. The front end 19 of the filter body 10 is closed like a closed bag by fusing the front end of the mesh member 12. The mesh member 12 is a plain weave of nylon 66 having a fiber diameter of 0.043 mm (about 250 meshes).

The connector body 20 is molded from a hard plastic material and includes an end plate 21 of the same size as the rear end wall 18 of the filter body 10 and an L-shaped cylindrical attachment 22 extending from the center of the end plate 21, then bent upward and attached to a downwardly directed suction port of an in-tank pump P. The end plate 21 of the connector body 20 has a central hole 23 communicating with the cylindrical attachment 22. The cylindrical attachment 22 includes a first cylindrical portion 24 extending backward from the end plate 21 of the connector body 20 and a second cylindrical portion 25 integrally extending upward from the first cylindrical portion 24 for attachment to the suction port of the pump P. The first and second cylindrical portions 24 and 25 of the cylindrical attachment 22 form an obtuse angle α therebetween, whereby the front side of the first cylindrical portion 24 is inclined somewhat downwardly as shown by the phantom line in FIG. 1 when the second cylindrical portion 25 is attached to the suction port of the tank P directed vertically downwardly.

Figure 3:
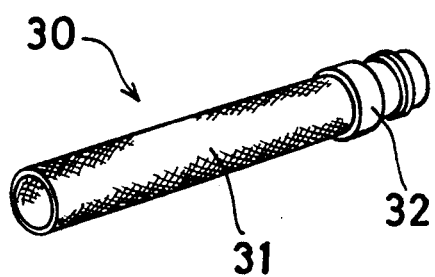
FIG. 3 is a perspective view showing a suction nozzle.
Figure 4:
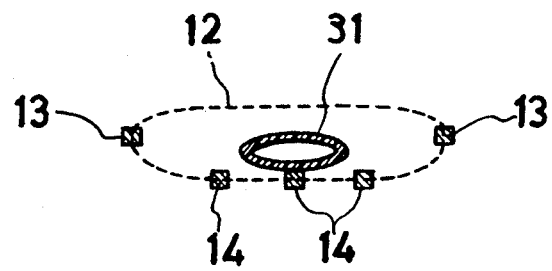
FIG. 4 is a cross-sectional view taken along line IV—IV in FIG. 1.

As shown in FIG. 3, the suction nozzle 30 comprises a deformable mesh cylinder 31 closed at the front end and a plastic cylindrical connector 32 attached to the rear end of the mesh cylinder 31. The cylindrical connector 32 is inserted into the second cylindrical portion 24 of the cylindrical attachment 22 through the hole 23 in the end plate 21 of the connector body 20. The mesh member of the suction nozzle 30 may be a plain weave, but is preferably a twill weave or derivative satin weave exhibiting large surface tension to facilitate suction withdrawal of fuel via the cylindrical connector 32 and connector body 22 when said mesh cylinder 31 is only partially immersed in fuel. The suction nozzle 30 has a length such that when the cylindrical connector is attached to the connector body 20, the closed front end of the suction nozzle 30 is disposed within the closed front end of the filter body 10.

The filter body 10 is insert-molded, with the rear end wall 18 of the the filter frame 11 disposed in front of the end plate 21 of the connector body 20 and the suction nozzle 30 incorporated into the filter frame 11. In order to obtain firm connection between the rear end wall 18 of the filter frame 11 and the end plate 21 of the connector body 20, the end plate 21 is provided on the opposite sides of the front surface thereof with projecting pins 27.

The hole 23 in the end plate 21 of the connector body 20 is inclined downward and the mesh cylinder 31 attached to the end plate 21 via the cylindrical connector 32 is laid along the bottom of the filter body 11 so that gasoline in the vicinity of the bottom of the filter body 11 can be pumped up.

The cylindrical attachment 22 is fitted into the suction port of the in-tank pump P and the pump P is set in position vertically within the fuel tank T. As a result, the lower surface of the forwardly inclined filter body 10 abuts against the bottom of the tank T. Since the filter frame 11 including the lateral and longitudinal ribs 13, 14, 15, 16 and 17 and the end wall 18 is molded from elastomer, it is flexible. Since the mesh cylinder 31 of the suction nozzle 30 is also flexible, the filter body 10 is laid along the bottom of the tank T as shown by solid line in FIG. 1, with the filter frame 11 and suction nozzle 30 flexed. Since the lower bulged portions 15' of the lateral ribs 15 maintain resilient and close contact with the bottom of the tank T at all times, no noise is produced by the vibration generated during running of the automobile. Therefore, the mesh member 12 is protected from wear.

Figure 5:
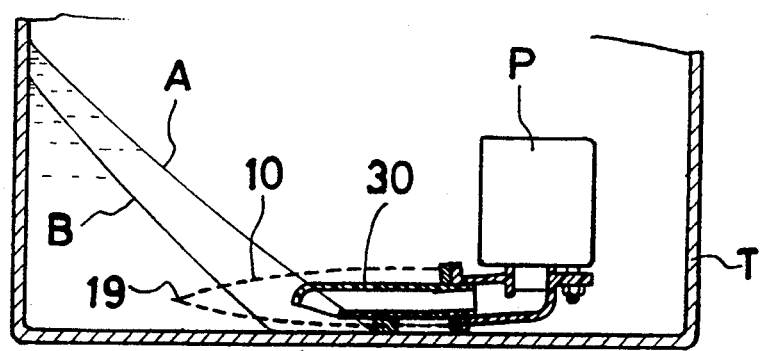
FIG. 5 is an explanatory view showing a prior art filter in use.

The front end portion of the mesh cylinder 31 of the suction nozzle 30 is pressed and deformed by the upper and lower layers of the mesh member 12 of the filter body 10 and is disposed within the closed front end of the filter body 10. Therefore, even when the liquid level of gasoline is inclined as shown by B in FIG. 5, the gasoline can be pumped up by the pump and supplied to the engine. When a twill weave or derivative satin weave is used as the mesh member of the suction nozzle 30, as described above, since the mesh member exhibits large surface tension, it can form an oil film layer over the entire surface thereof even if it comes into partial contact with the gasoline. Therefore, the pumping efficiency can be enhanced.

As has been described in the foregoing, according to the present invention, since the front end of a suction nozzle is disposed within the closed front end of a filter body, it is possible to pump up gasoline which has not been heretofore sucked.

What is claimed is:

1. A filter for an in-tank pump of an automobile fuel tank, comprising:
    a flat bag-shaped filter body having a closed front end and a rear end wall and including a mesh member and a filter frame, the filter frame being made of an elastic material and having a plurality of longitudinal and lateral ribs formed on major upper and lower portions of the filter frame, wherein the lateral ribs formed on the major lower portion of said filter frame are adapted to be disposed on and pressed against a bottom of said automobile fuel tank;
    a connector body including a cylindrical attachment for attaching said filter body to a suction port of said in-tank pump and an end plate jointed to an outer surface of said rear end wall of said filter body; and
    a suction nozzle including a deformable mesh cylinder disposed in said filter body and having an open backward end and a closed forward end and a cylindrical connector having a first end attached to said end plate of said connector body and a second end attached to the open backward end of said mesh cylinder so that said mesh cylinder communicates with said cylindrical attachment;
    said mesh cylinder having a length such that the closed forward end thereof is disposed within said filter body at a position of the closed front end of said filter body, the closed forward end of said mesh cylinder being made flat by the closed front end of said filter body and wherein said mesh cylinder is formed of a woven mesh material exhibiting a high surface tension to facilitate suction withdrawal of fuel via the cylindrical connector and connector body when said mesh cylinder is only partially immersed in fuel; and
    said cylindrical connector being connected to said end plate so that said mesh cylinder is laid along a lower surface of said mesh member of said filter body.

2. A filter according to claim 1, wherein said elastic material is soft nylon 6.

3. A filter according to claim 1, wherein said elastic material is elastomer.

4. A filter according to claim 1, wherein at least part of said ribs on the major lower portion of said filter frame has a lower bulged portion which is in resilient contact with the bottom of the fuel tank.

5. A filter according to claim 1, wherein said mesh cylinder of said suction nozzle is a twill weave.

6. A filter according to claim 1, wherein said mesh cylinder of said suction nozzle is a derivative satin weave.

* * * * *